United States Patent [19]
Hu

[11] Patent Number: 6,055,732
[45] Date of Patent: May 2, 2000

[54] PIPE CUTTER

[76] Inventor: Bobby Hu, P.O. Box 63-247, Taichung, Taiwan

[21] Appl. No.: 09/167,145

[22] Filed: Oct. 6, 1998

[51] Int. Cl.⁷ .................................................. B23D 21/08
[52] U.S. Cl. ................................................. 30/102; 30/94
[58] Field of Search .................................. 30/92, 93, 94, 30/95, 101, 102

[56] References Cited

U.S. PATENT DOCUMENTS

| 565,267 | 8/1896 | Griffin | 30/102 |
|---|---|---|---|
| 812,210 | 2/1906 | Kovacs | 30/94 |
| 1,841,251 | 1/1932 | Miller | 30/102 |
| 2,283,572 | 5/1942 | Petersen | 30/102 |
| 2,875,518 | 3/1959 | Dyczynski | 30/102 |
| 2,988,814 | 6/1961 | Carpenter | 30/102 |
| 5,414,932 | 5/1995 | Azkona | 30/102 |

FOREIGN PATENT DOCUMENTS 405860  1/1910  France ..................................... 30/102

*Primary Examiner*—Hwei-Siu Payer
*Attorney, Agent, or Firm*—Charles E Baxley, Esq.

[57] ABSTRACT

A pipe cutter includes a body having two side walls and each of the side walls has an arcuate slot. A rod pivotally extends through the first end of the body and a first contacting member is rotatably connected to the second end of the body. A first link has a first end thereof pivotally connected to the body and a second end thereof having a disk blade rotatably connected thereto. The rod is pivotally connected to the first link to which a second link is pivotally connected, the other end of the second link has a second contacting member rotatably connected thereto. The second contacting member has two protrusions extending centrally and longitudinally therefrom so as to move within the two arcuate slots.

8 Claims, 20 Drawing Sheets

PIPE CUTTER

FIELD OF THE INVENTION

The present invention relates to a pipe cutter having two rollers and a disk blade wherein one of the rollers and the disk blade are movable and connected together by links so that the pipe to be cut is evenly and firmly clamped by three contacting points.

BACKGROUND OF THE INVENTION

A conventional pipe cutter generally includes a body made of cast iron, fixed two rollers arranged to an inner side of the body and a movable blade disk movably connected to a threaded rod which can be moved by rotating a knob connected to a distal end of the threaded rod. A pipe to be cut can be clamped by the two fixed rollers and the disk blade which is moved toward the two fixed rollers. By rotating the threaded rod, the disk blade cuts the pipe. However, the speed to move the disk blade is so slow so that it takes a lot of time to cut the pipe. In addition, the conventional pipe cutter can be only used to cut the pipe having the smaller diameter, because the distance between the two rollers is not adjustable so that a pipe having a large diameter will not well clamped between the two rollers and the disk blade. Furthermore, the threaded rod can only be moved in a fixed direction and this limits the positions where the rollers are located. All of the three pipe cutters are made in a form of a one-piece article which is made of cast iron which heavy so that the users cannot use them conveniently. The cost for manufacturing the conventional pipe cutters is high and therefore reduces the commercial benefit.

The present invention intends to provide an improved pipe cutter wherein one of two rollers is fixed and the other is movable, the disk blade is movable and pivotally connected to the movable roller by two links so that the two rollers and the blade disk clamp the pipe to be cut evenly on the outside of the pipe, and the pipe cutter of the present invention may clamp pipes with different diameters.

SUMMARY OF THE INVENTION

In accordance with one aspect of the present invention, there is provided a pipe cutter comprising a body having two side walls and each of the side walls having an arcuate slot defined therethrough. The body has a first end with a rod movably extending therethrough and a second end having a first contacting member rotatably connected thereto. A first link has a first end thereof pivotably connected to the body and a second end thereof having a disk blade rotatably connected thereto. The rod is pivotally connected to the first link. A second link has a first end thereof pivotally connected to the first link and a second end thereof having a second contacting member rotatably connected thereto. The second contacting member has two protrusions extending centrally and longitudinally therefrom so as to move within the two arcuate slots.

An object of the present invention is to provide a pipe cutter with a fixed roller, a movable roller and a movable disk blade so as to clamp a pipe to be cut firmly.

Further objects, advantages, and features of the present invention will become apparent from the following detailed description with appropriate reference to the accompanying drawings.

DETAILED DESCRIPTION OF THE PREFERRED EMBODIMENTS

Figure 1:
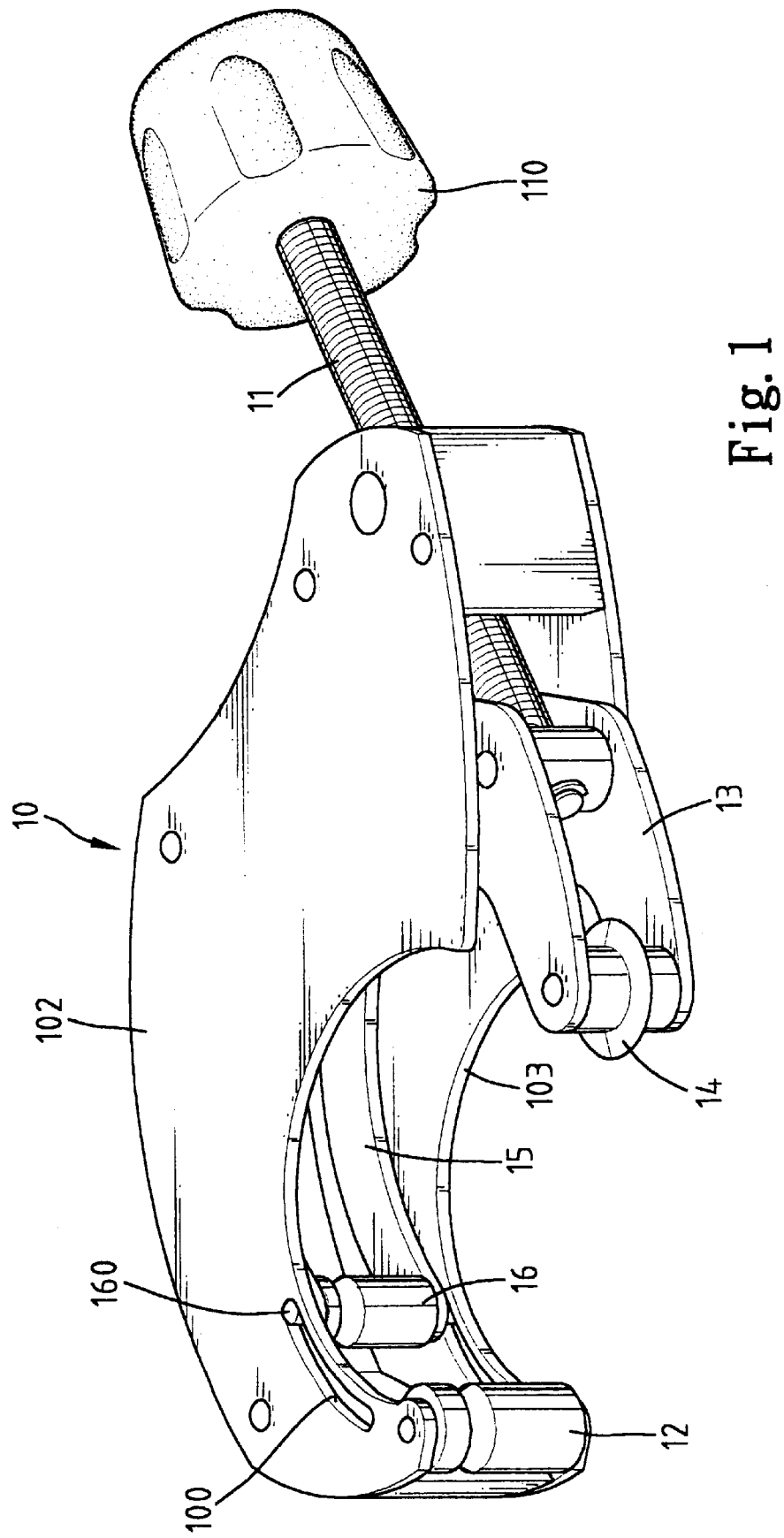
FIG. 1 is a perspective view of the first embodiment of the pipe cutter in accordance with the present invention.
Figure 2:
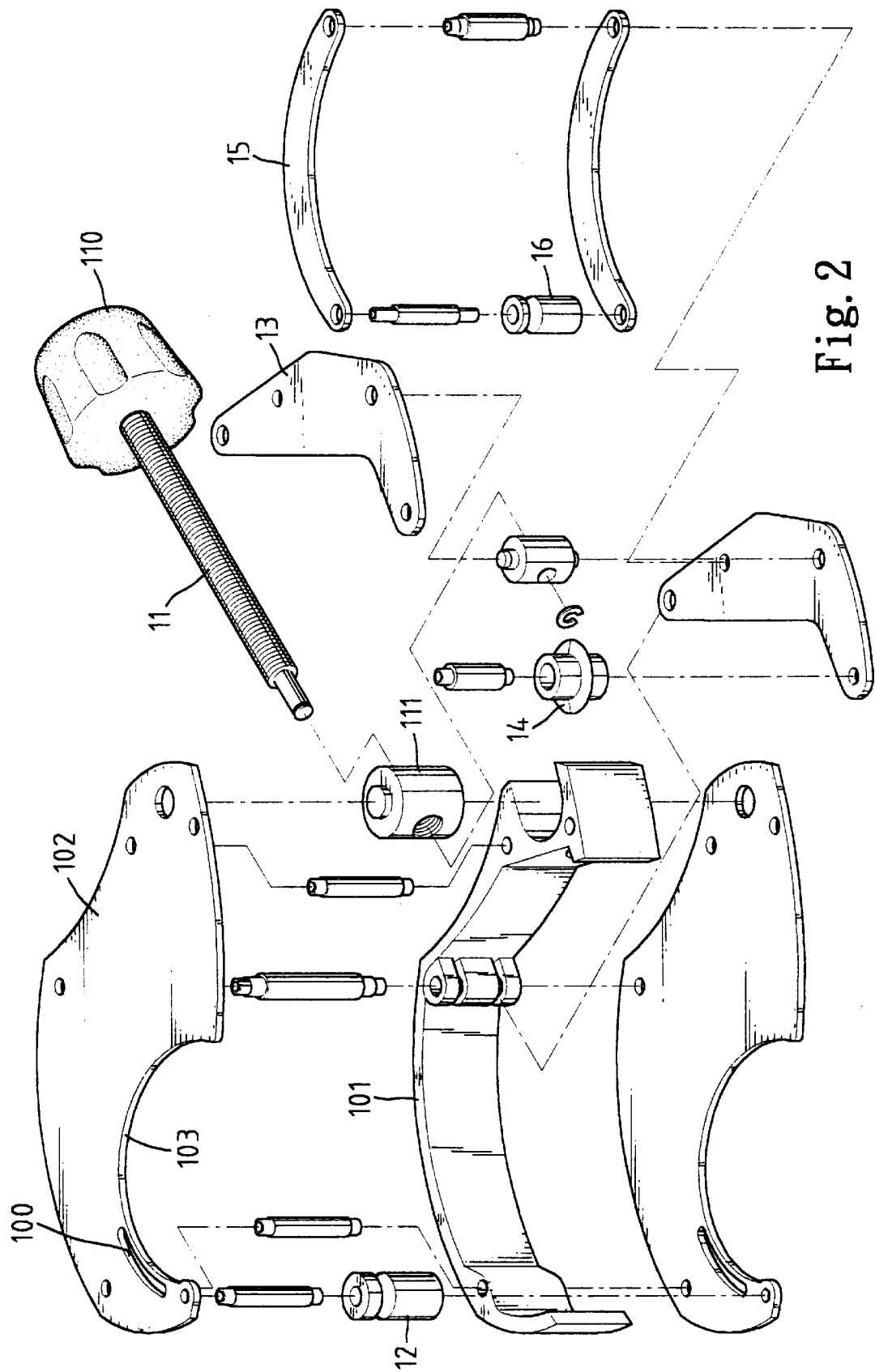
FIG. 2 is an exploded view of the first embodiment of the pipe cutter in accordance with the present invention.
Figure 3:
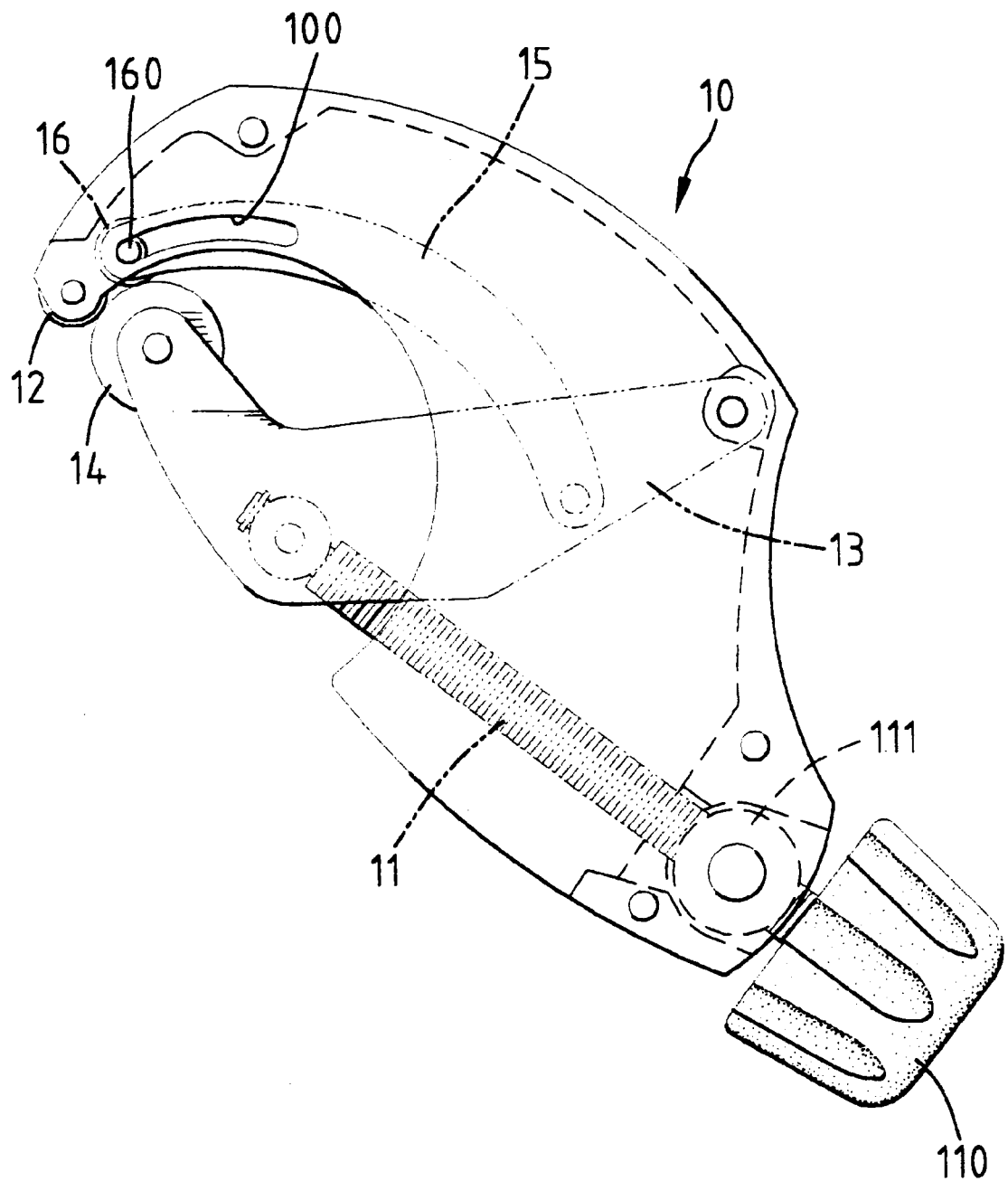
FIG. 3 is an illustrative view to illustrate the first embodiment of the pipe cutter of the in accordance with the present invention, wherein the two rollers and the disk blade are moved together.
Figure 4:
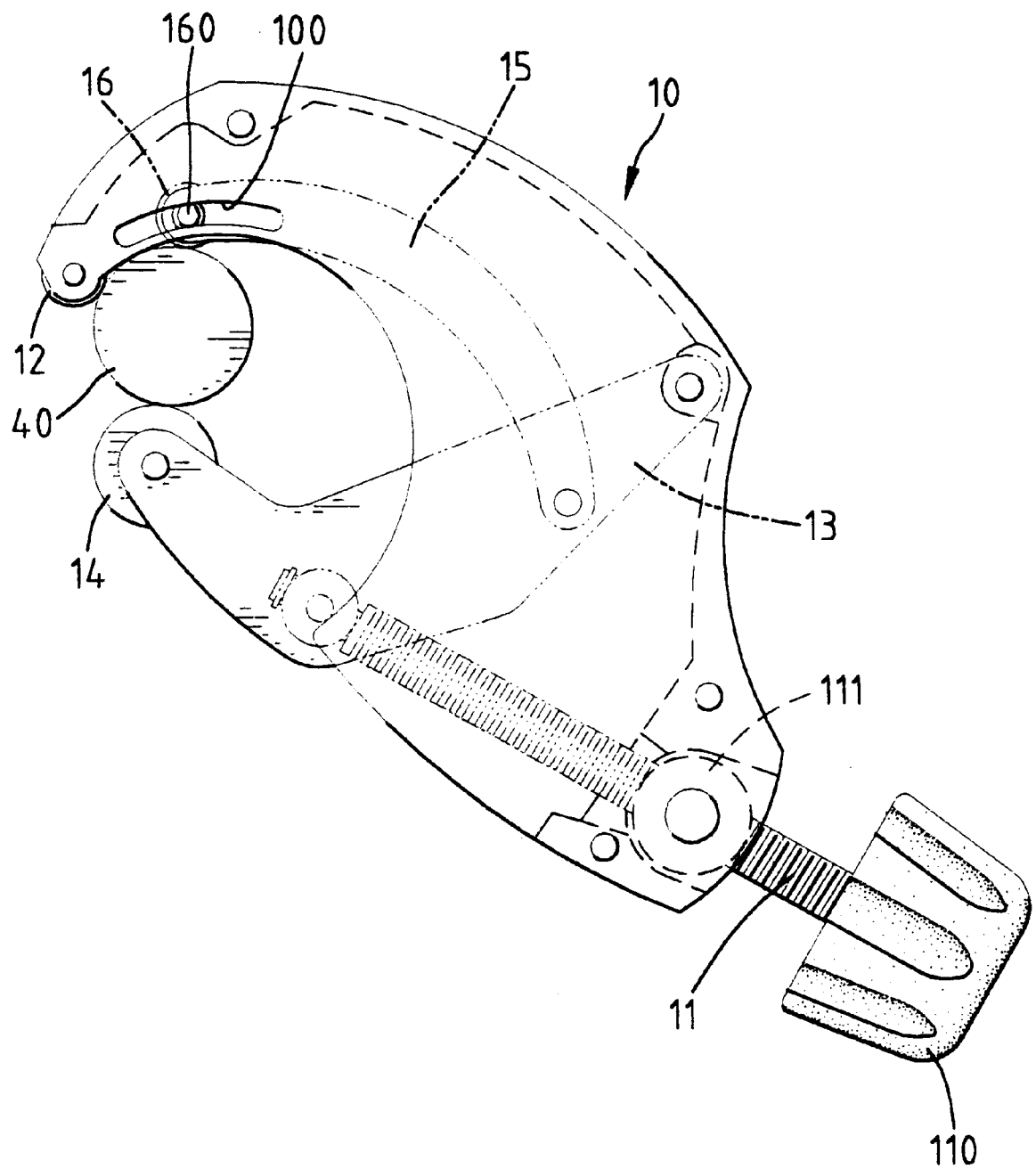
FIG. 4 is an illustrative view to illustrate the first embodiment of the pipe cutter of the in accordance with the present invention, wherein a small pipe is clamped in the pipe cutter.

Referring to FIGS. 1 to 4, the pipe cutter in accordance with the present invention comprises a body 10 having an arcuate plate 101 and the two side walls 102 extending from two opposite sides of the arcuate plate 101, each of the two side walls 102 having an arcuate slot 100 defined therethrough. A threaded rod 11 threadedly and movably extends through a tube 111 pivotally received in the first end of the body 10, and a first contacting member 12 is rotatably connected to the body 10. A knob 110 connected to one of two ends of the threaded rod 11 and opposite to the first contacting member 12.

Figure 5:
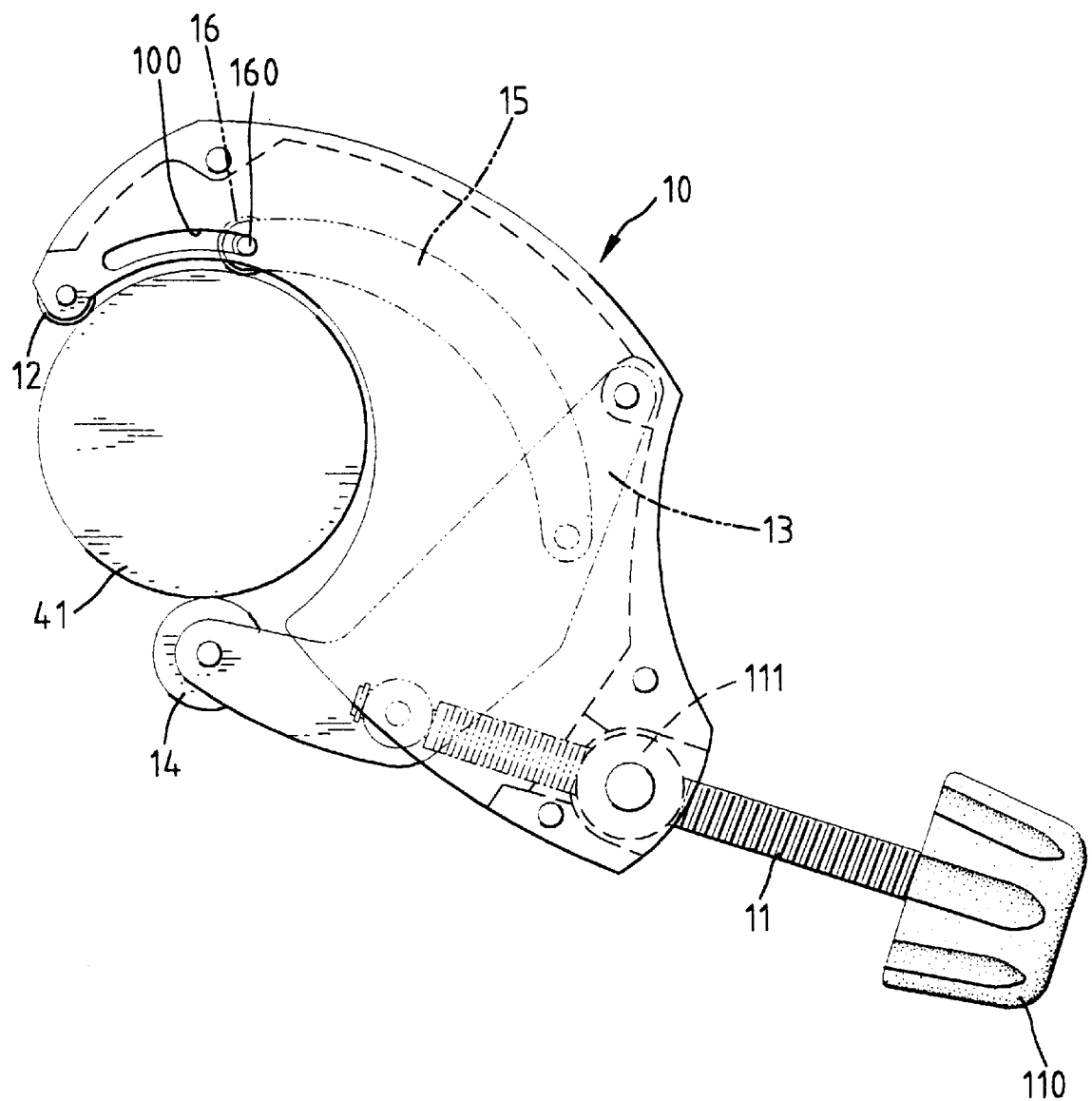
FIG. 5 is an illustrative view to illustrate the first embodiment of the pipe cutter of the in accordance with the present invention, wherein a large pipe is clamped in the pipe cutter.

A first link 13 has a first end thereof pivotally connected to the body 10 and a second end thereof having a disk blade 14 rotatably connected thereto. The other end of the threaded rod 11 is pivotally connected to the first link 13 so that when moving the threaded rod 11, the disk blade 14 is moved toward the first contacting member 12. A second link 15 has a first end thereof pivotally connected to the first link 13 and a second end thereof having a second contacting member 16 rotatably connected thereto which has a pin extending through the second contacting member 16 so that two protrusions 160 extend centrally and longitudinally from two ends of the second contacting member 16 and respectively move within the two arcuate slots 100. The second contacting member 16 is moved according to the movement of the disk blade 14 so that when moving the disk blade 14 to an extreme position where the disk blade 14 contacts the first contacting member 12, the second contacting member 16 is located beside the first contacting member 12. Therefore, when clamping a small pipe 40, the three contacting points on the pipe 40 are located at an equal angular distance. Referring to FIG. 5, when a large pipe 41 is clamped by the pipe cutter, the first contacting member 12 and the second contacting member 16 are separated wide apart so as to firmly hold the pipe 41.

Each of the two side walls 102 has an arcuate recess 103 defined in one of two sides thereof so as to receive a pipe 40 to be cut. It is to be noted that each of the first link 13 and the second link 15 includes two plates connected with each other with a gap defined between the two plates so that the total weight of the pipe cutter is reduced. The two plates and the two side walls 102 can be made of plastic material, and are connected together by rivets so as to conveniently assemble the pipe cutter.

Figure 6:
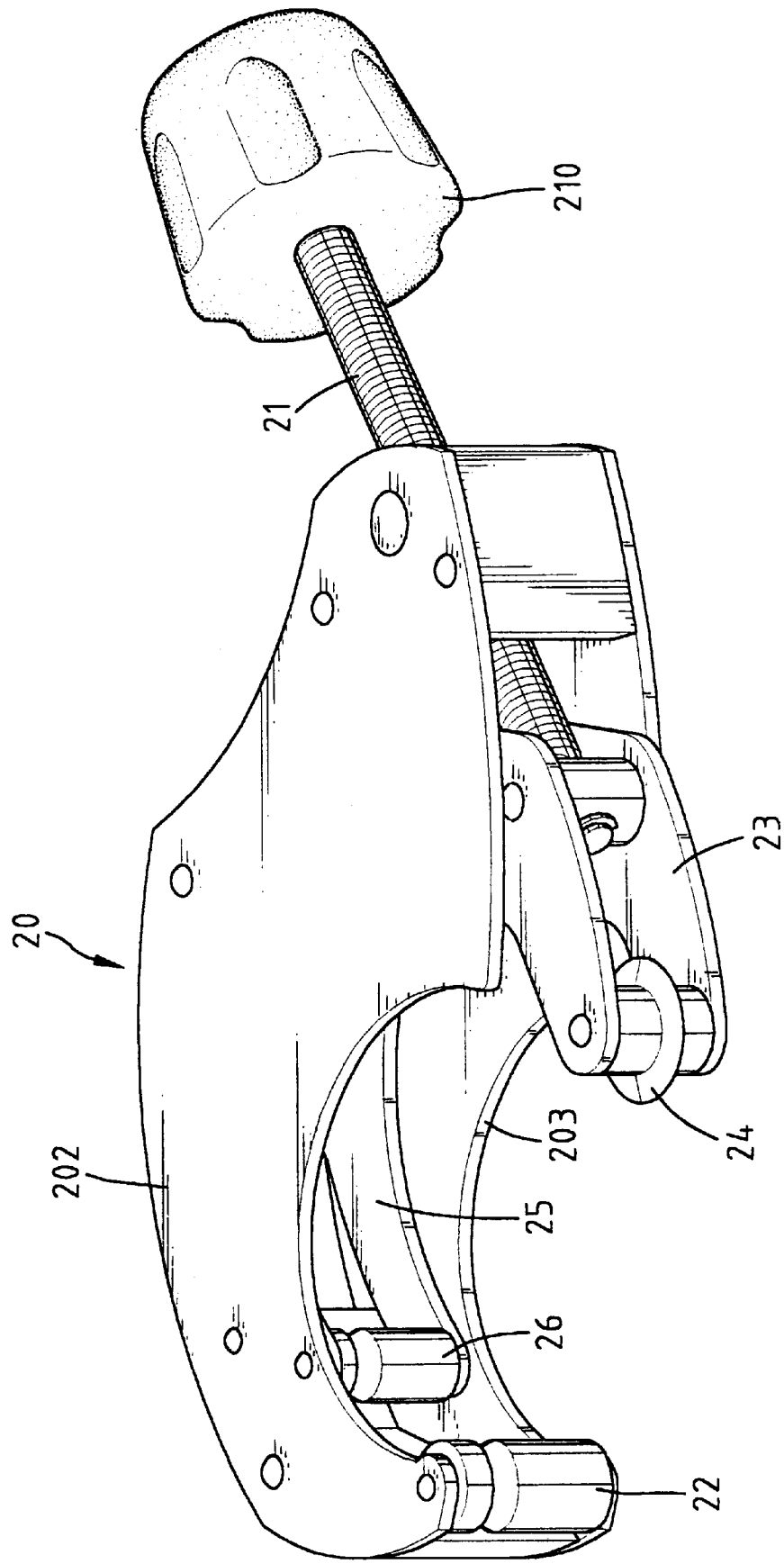
FIG. 6 is a perspective view of the second embodiment of the pipe cutter in accordance with the present invention.
Figure 7:
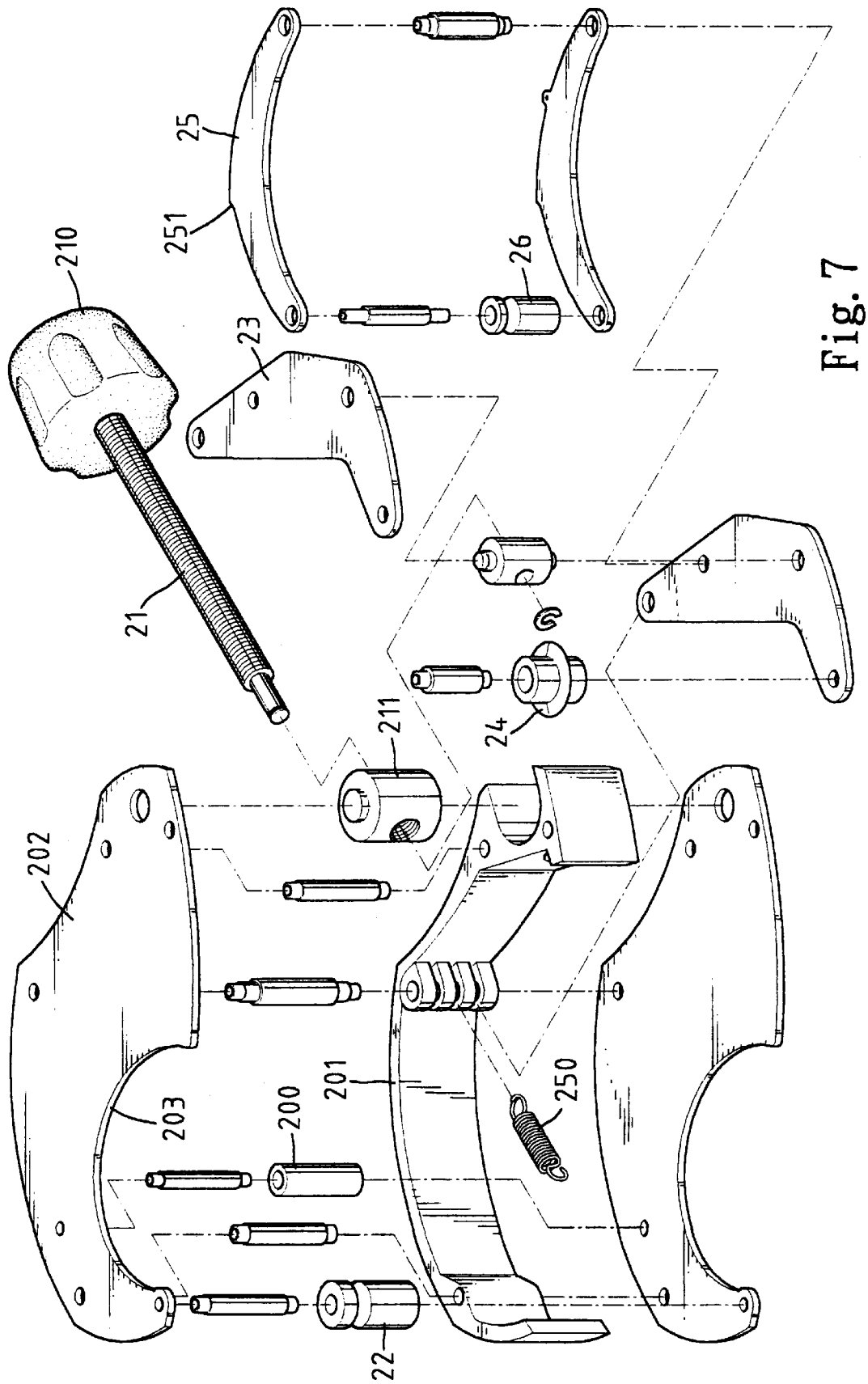
FIG. 7 is an exploded view of the second embodiment of the pipe cutter in accordance with the present invention.
Figure 8:
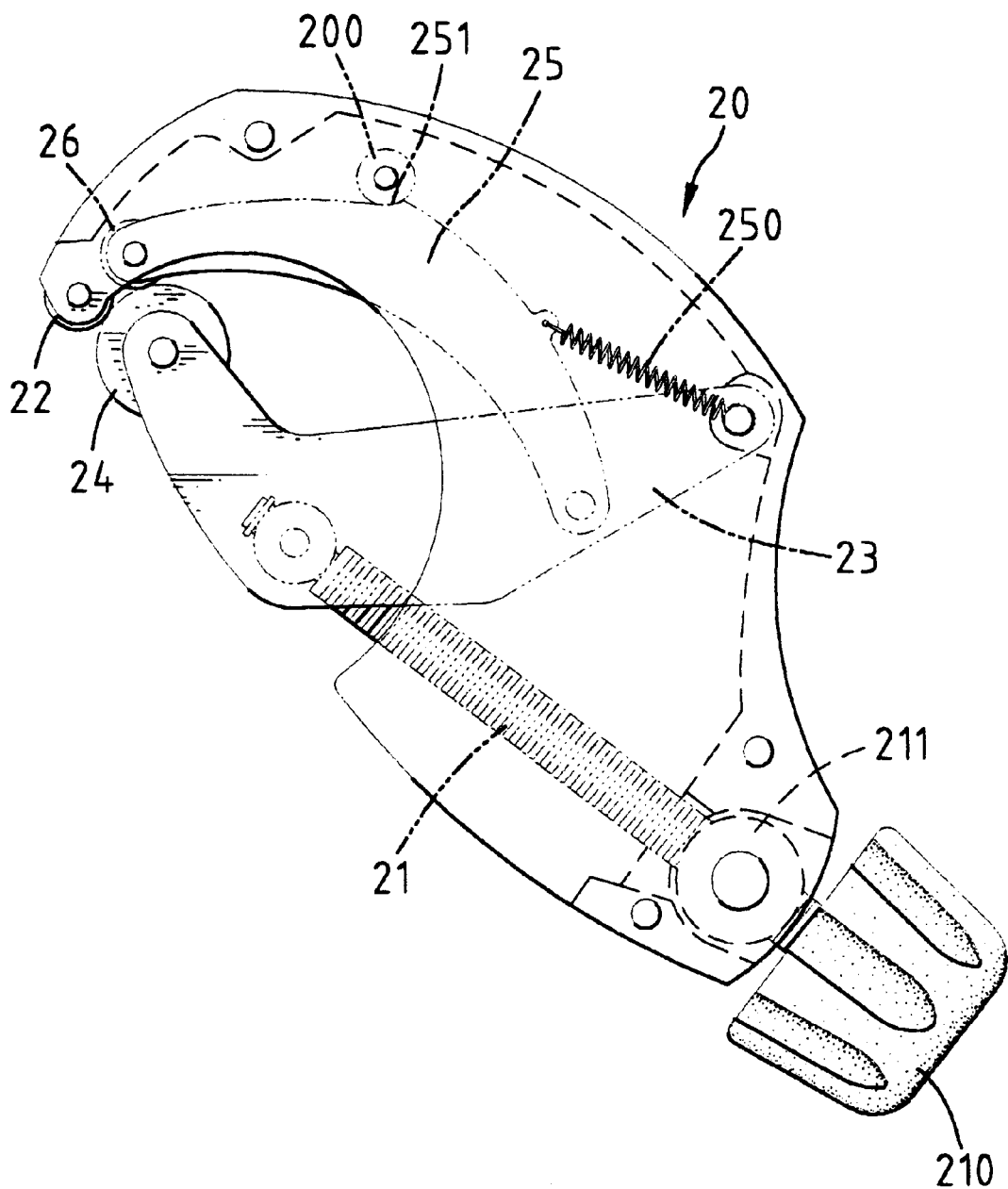
FIG. 8 is an illustrative view to illustrate the second embodiment of the pipe cutter of the in accordance with the present invention, wherein the two rollers and the disk blade are moved together.

Referring to FIGS. 6 to 8 showing the second embodiment of the pipe cutter of the present invention, wherein the pipe cutter comprises a body 20 having an arcuate plate 201 and two side walls 202 extend from two opposite sides of the arcuate plate 201. The body 20 has the first end thereof with a threaded rod 21 movably and pivotally extending therethrough and a second end having a first contacting member 22 rotatably connected thereto. The threaded rod 21 extends through the tube 211 which is pivotally received in the first end of the body 20. A guide roller 200 is connected between the two side walls 202, and a knob 210 is connected to the threaded rod 21. Each of the two side walls 202 has an arcuate recess 203 defined in one of two sides thereof so as to be adapted to receive a pipe to be cut.

A first link 23 has a first end thereof pivotally connected to the body 20 and a second end thereof having a disk blade 24 rotatably connected thereto, the threaded rod 21 pivotally connected to the first link 23. A second link 25 has a first end thereof pivotally connected to the first link 23 and a second end thereof having a second contacting member 26 rotatably connected thereto. A spring 250 is biased between the second link 25 and the body 20 and the guide roller 200 rolls on the back of the second link 25 when the second link 25 moves. The second link 25 has a raised portion 251 which contacts the guide roller 200 when the second contacting member 26 is moved beside the first contacting member 22 as shown in FIG. 8. Each of the first link 23 and the second link 25 includes two plates connected with each other with a gap defined between the two plates.

Figure 9:
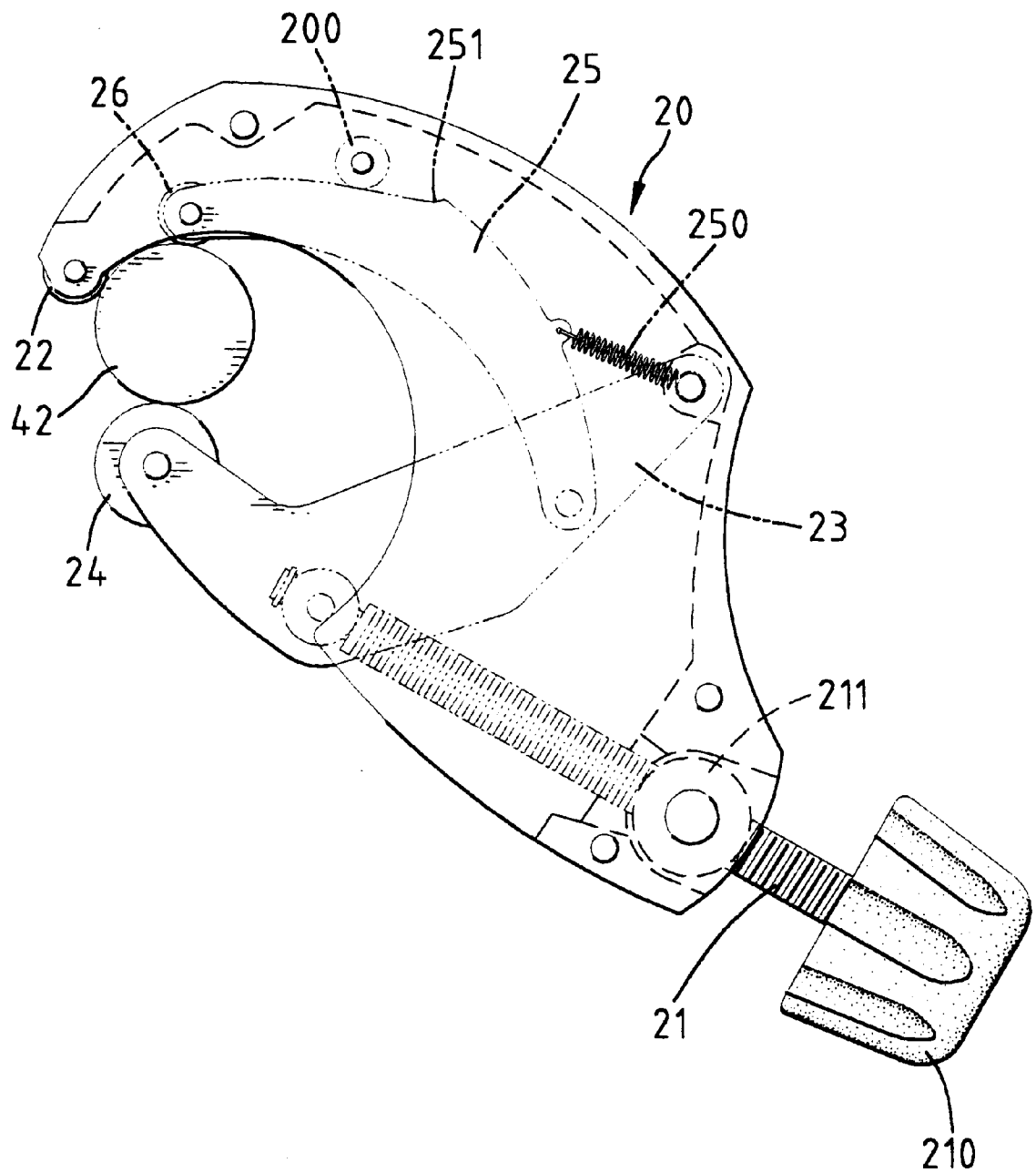
FIG. 9 is an illustrative view to illustrate the second embodiment of the pipe cutter of the in accordance with the present invention, wherein a small pipe is clamped in the pipe cutter.
Figure 10:
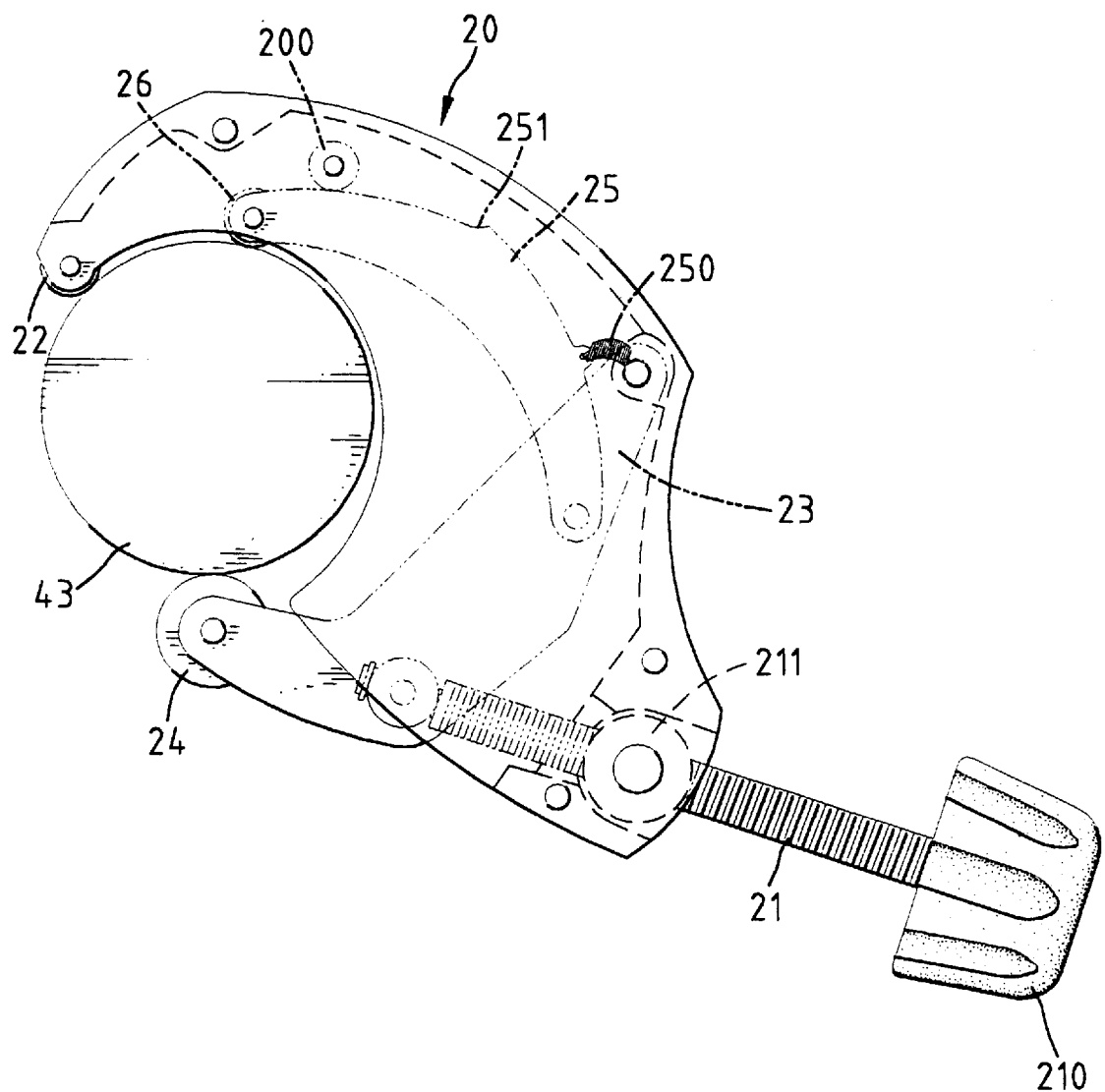
FIG. 10 is an illustrative view to illustrate the second embodiment of the pipe cutter of the in accordance with the present invention, wherein a large pipe is clamped in the pipe cutter.

FIGS. 9 and 10 respectively show the pipe cutter clamps a small pipe 42 and a large pipe 43, wherein the second link 25 moves by rolling on the guide roller 200 and the spring 250 pulls the second link 25 to contact the guide roller 200.

Figure 11:
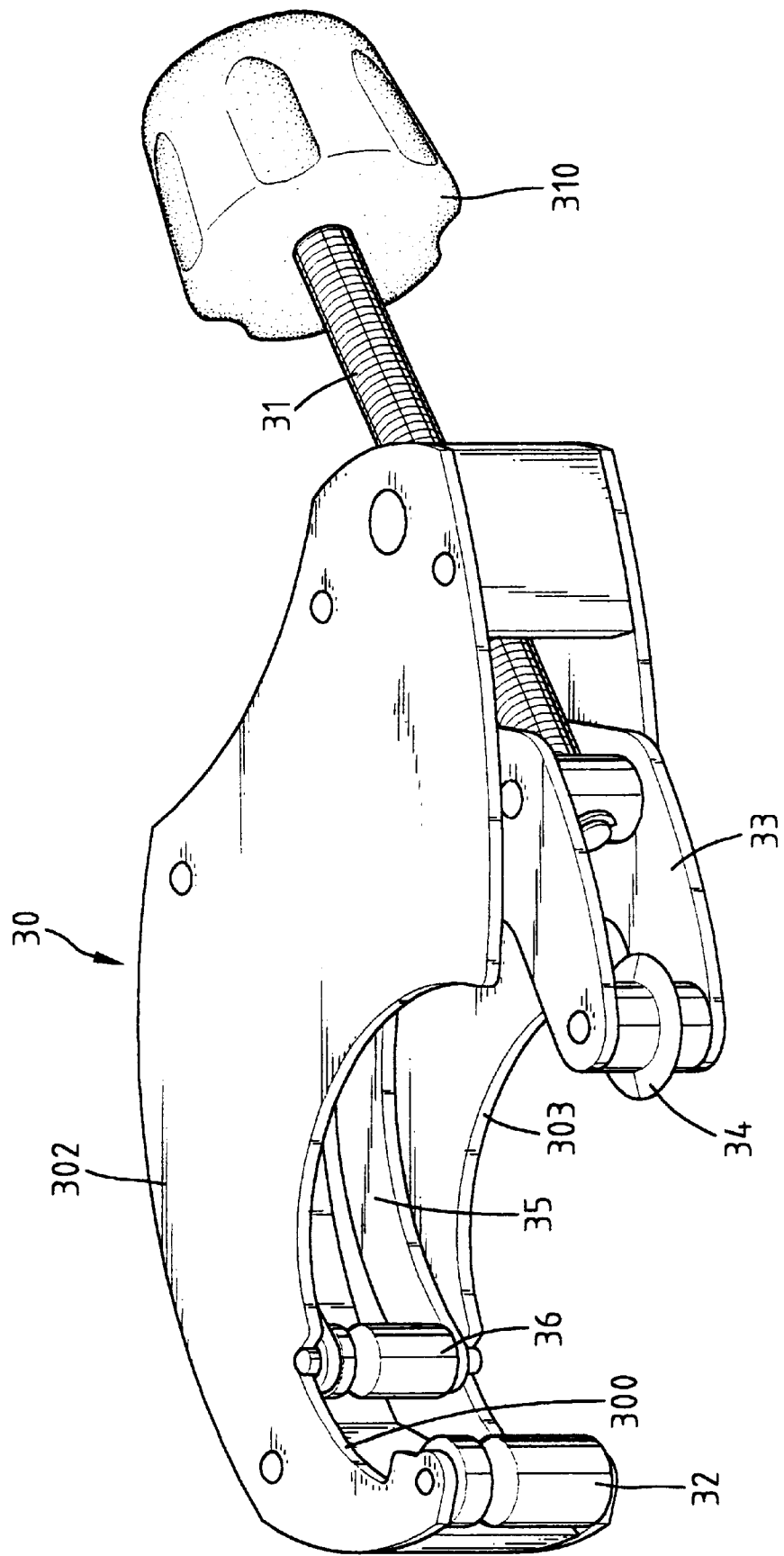
FIG. 11 is a perspective view of the third embodiment of the pipe cutter in accordance with the present invention.
Figure 12:
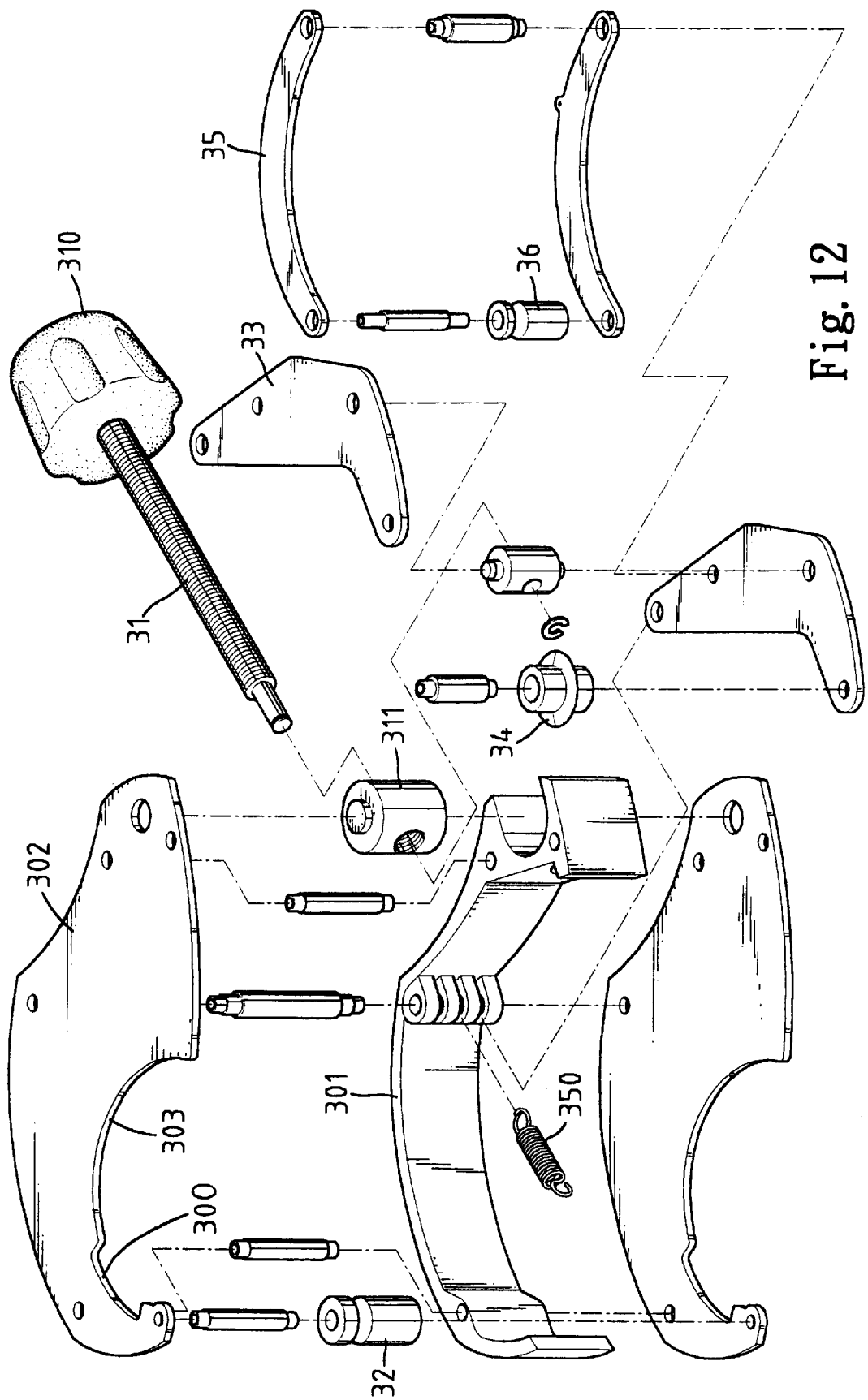
FIG. 12 is an exploded view of the second embodiment of the pipe cutter in accordance with the present invention.
Figure 13:
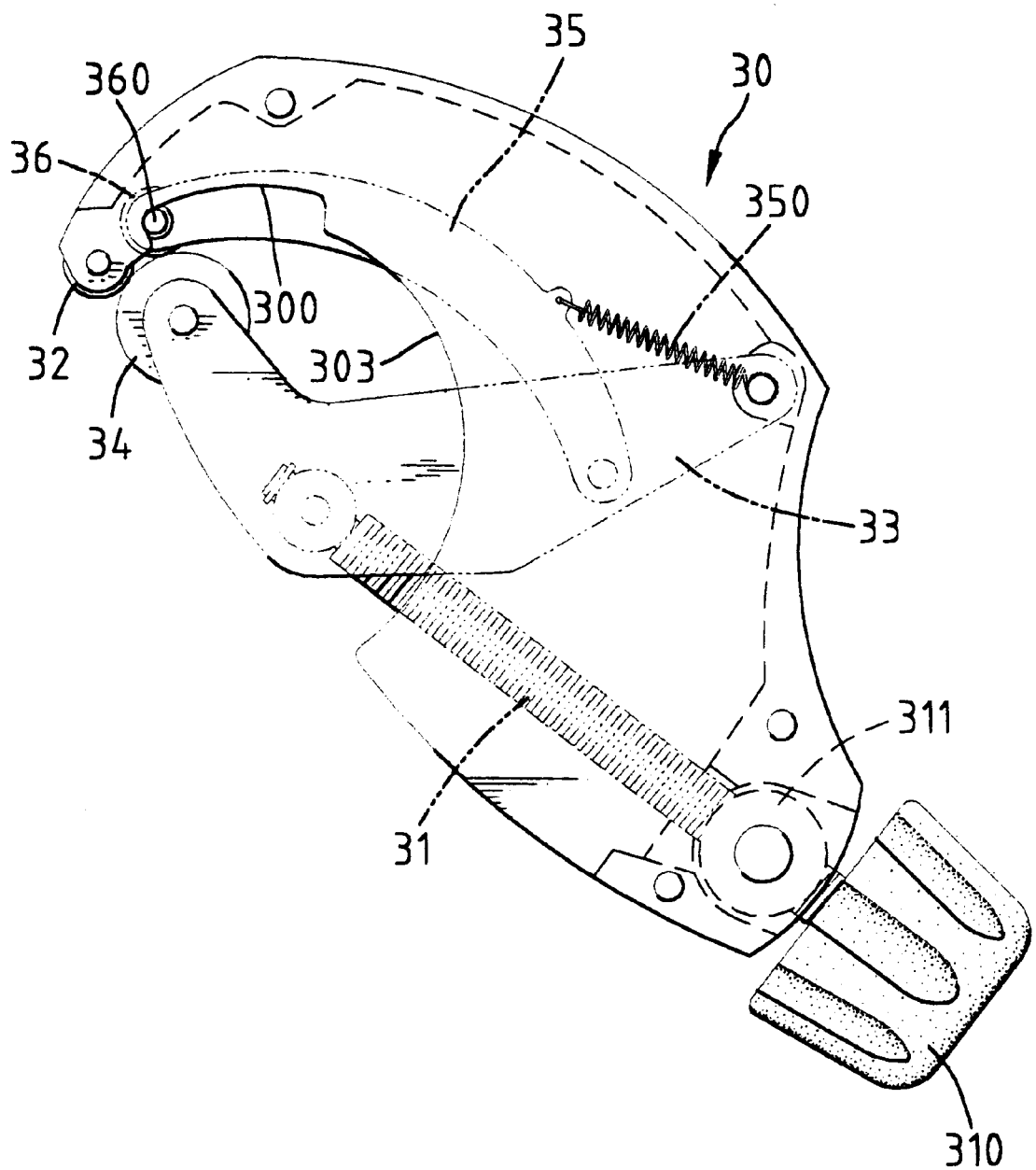
FIG. 13 is an illustrative view to illustrate the second embodiment of the pipe cutter of the in accordance with the present invention, wherein the two rollers and the disk blade are moved together.

FIGS. 11 to 13 show the third embodiment of the pipe cutter of the present invention which comprises a body 30 having an arcuate plate 301 and two side walls 302 extend from two opposite sides of the arcuate plate 301. Each of the two side walls 302 has an arcuate recess 303 and an arcuate notch 300 respectively defined in one of two sides thereof, the arcuate recess 303 communicating with the arcuate notch 300. The body 30 has a first end with a threaded rod 31 pivotally extending therethrough and a second end thereof having a first contacting member 32 rotatably connected thereto. The threaded rod 31 extends through a tube 311 pivotally received in the first end of the body 30 and a knob 310 is connected to one of two ends of the threaded rod 31.

A first link 33 has a first end thereof pivotally connected to the body 30 and a second end thereof having a disk blade 34 rotatably connected thereto, the rod 31 pivotally connected to the first link 33. A second link 35 has a first end thereof pivotally connected to the first link 33 and a second end thereof having a second contacting member 36 rotatably connected thereto. A spring 350 biased between the second link 35 and the body 30. A pin extends through the second contacting member 36 so as to have two protrusions 360 extending centrally and longitudinally from two ends of the second contacting member 36 such that the two protrusions 360 move along the two arcuate notches 300. Each of the first link 33 and the second link 35 includes two plates connected with each other with a gap defined between the two plates.

Figure 14:
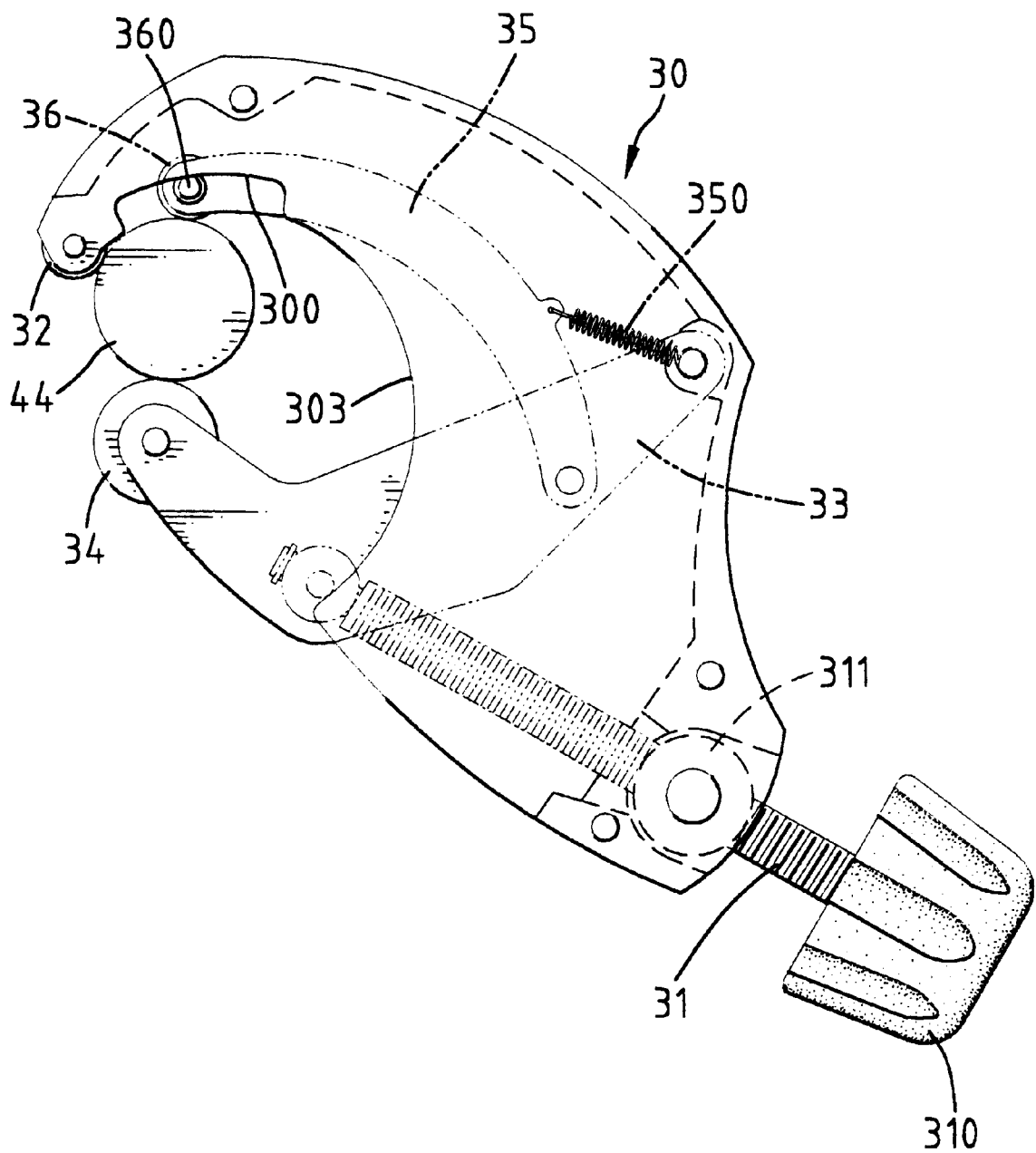
FIG. 14 is an illustrative view to illustrate the third embodiment of the pipe cutter of the in accordance with the present invention, wherein a small pipe is clamped in the pipe cutter.
Figure 15:
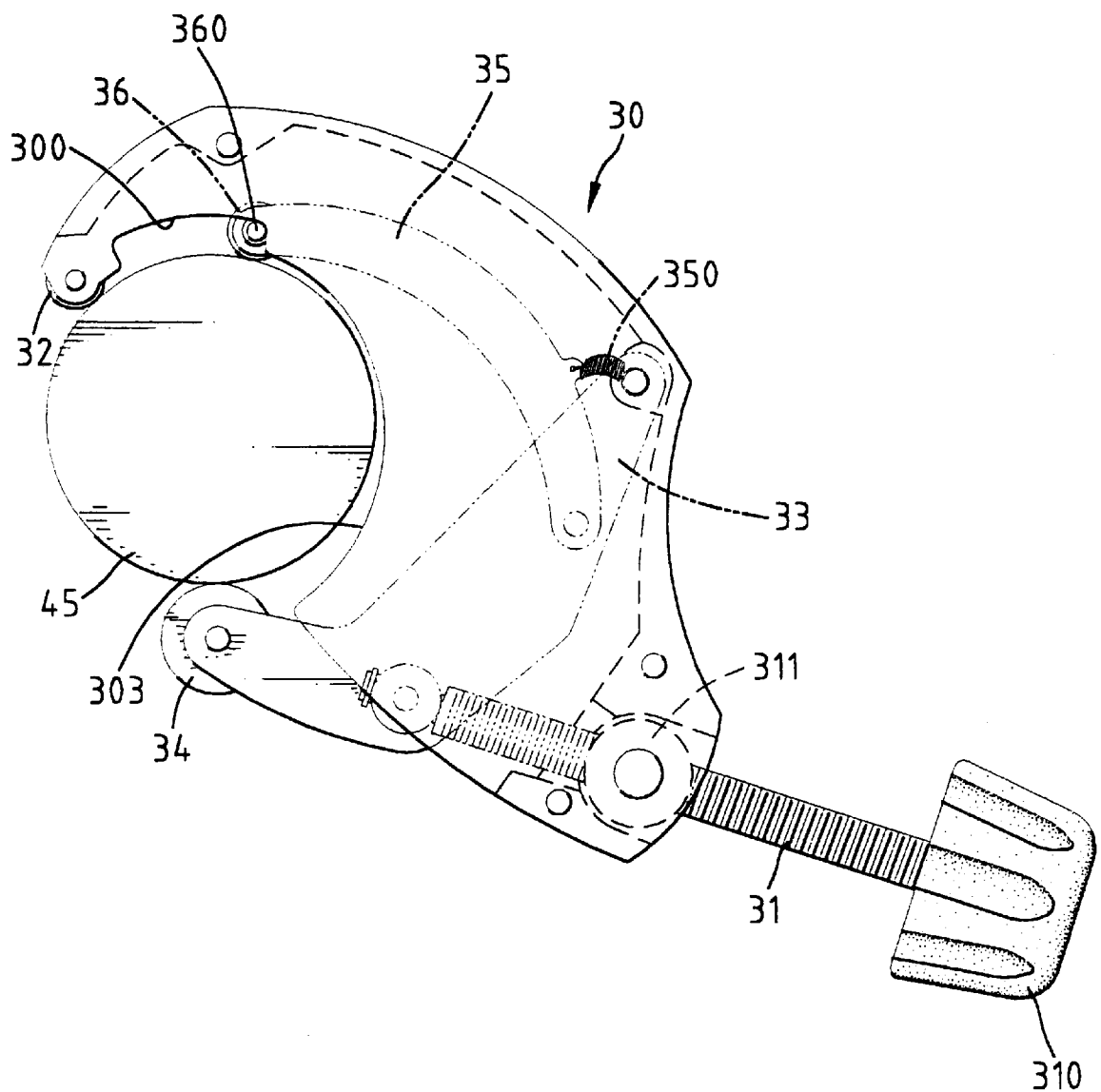
FIG. 15 is an illustrative view to illustrate the third embodiment of the pipe cutter of the in accordance with the present invention, wherein a large pipe is clamped in the pipe cutter.

Referring to FIGS. 14 and 15 which respectively show a small pipe 44 and a large pipe 45 clamped by the pipe cutter, the second contacting member 36 is moved according to the sizes of the pipes 44, 45.

Figure 16:
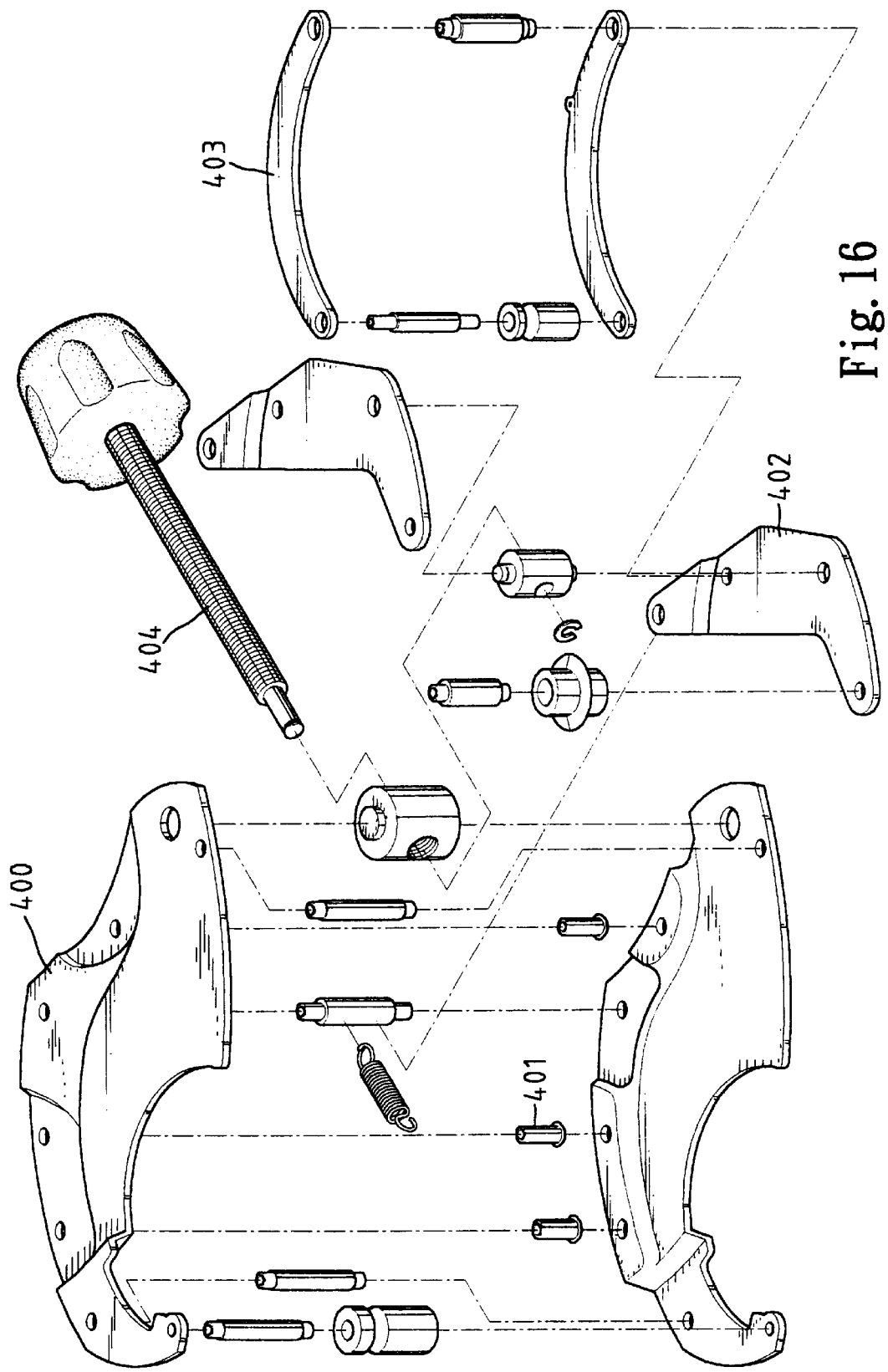
FIG. 16 is an exploded view of the fourth embodiment of the pipe cutter in accordance with the present invention.
Figure 17:
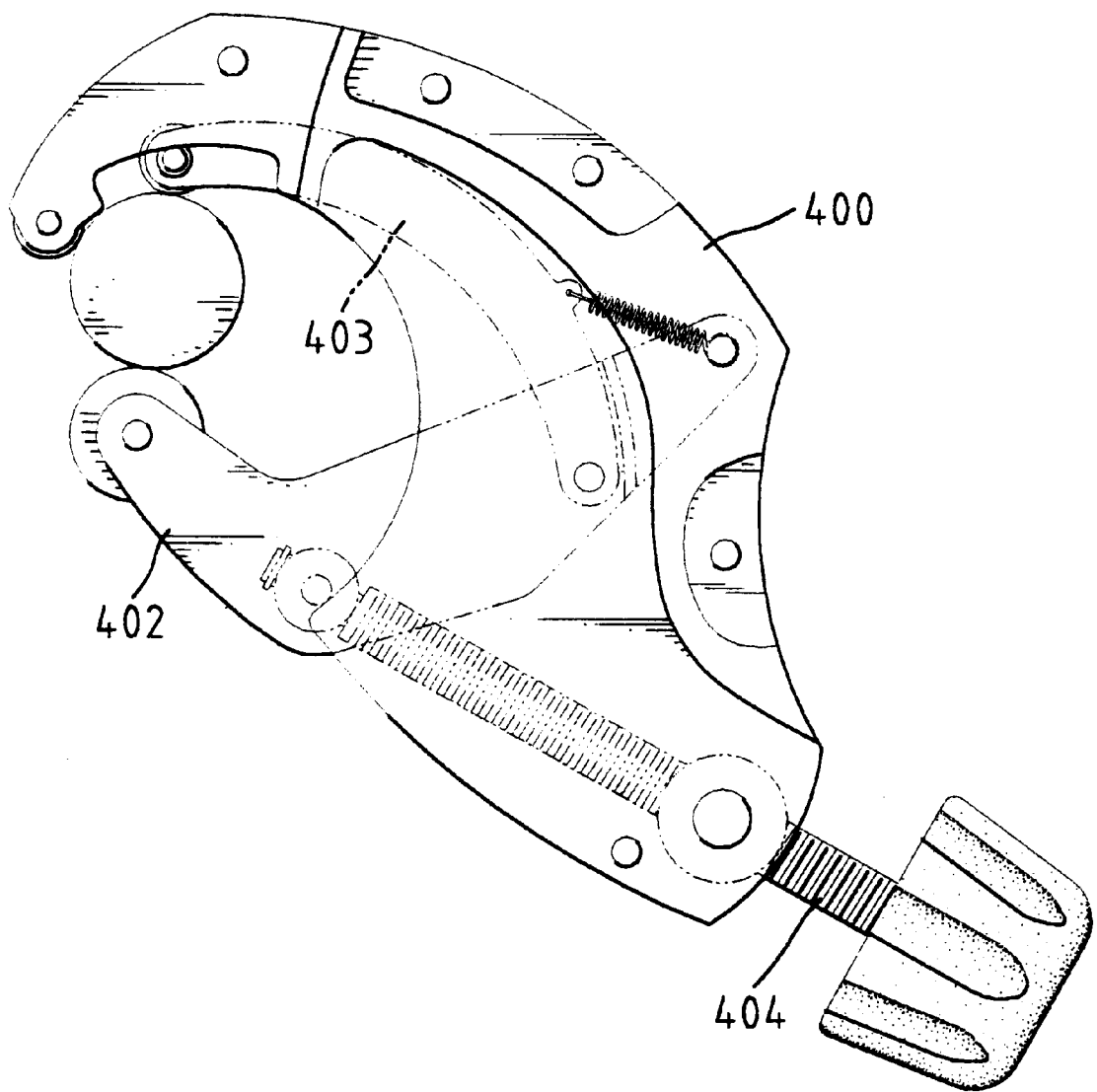
FIG. 17 is an illustrative view to illustrate the fourth embodiment of the pipe cutter of the in accordance with the present invention.
Figure 18:
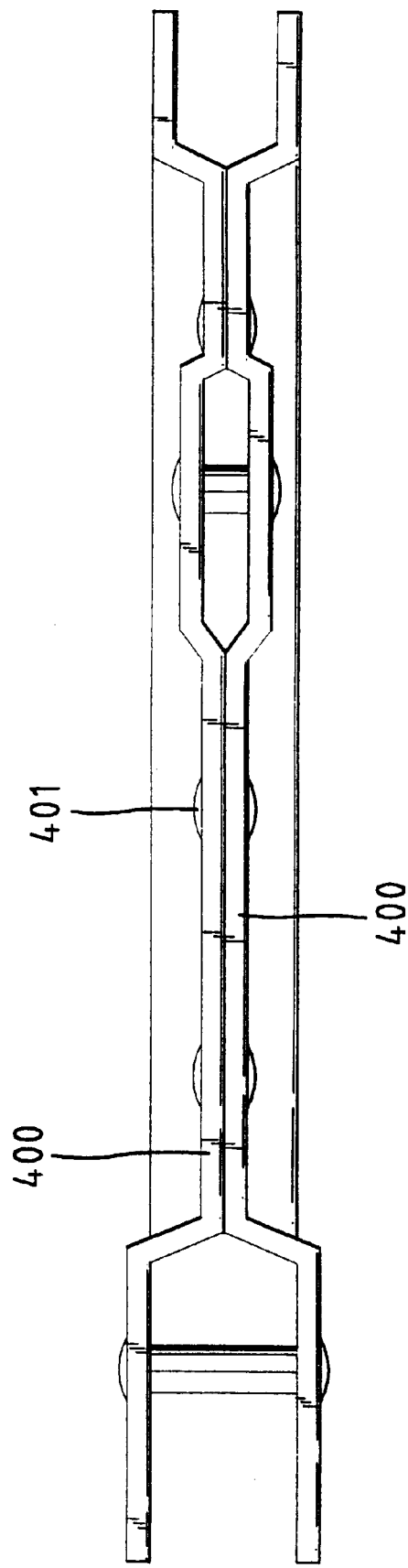
FIG. 18 is an end view to show the two side walls connected with each other of the fourth embodiment of the pipe cutter.
Figure 19:
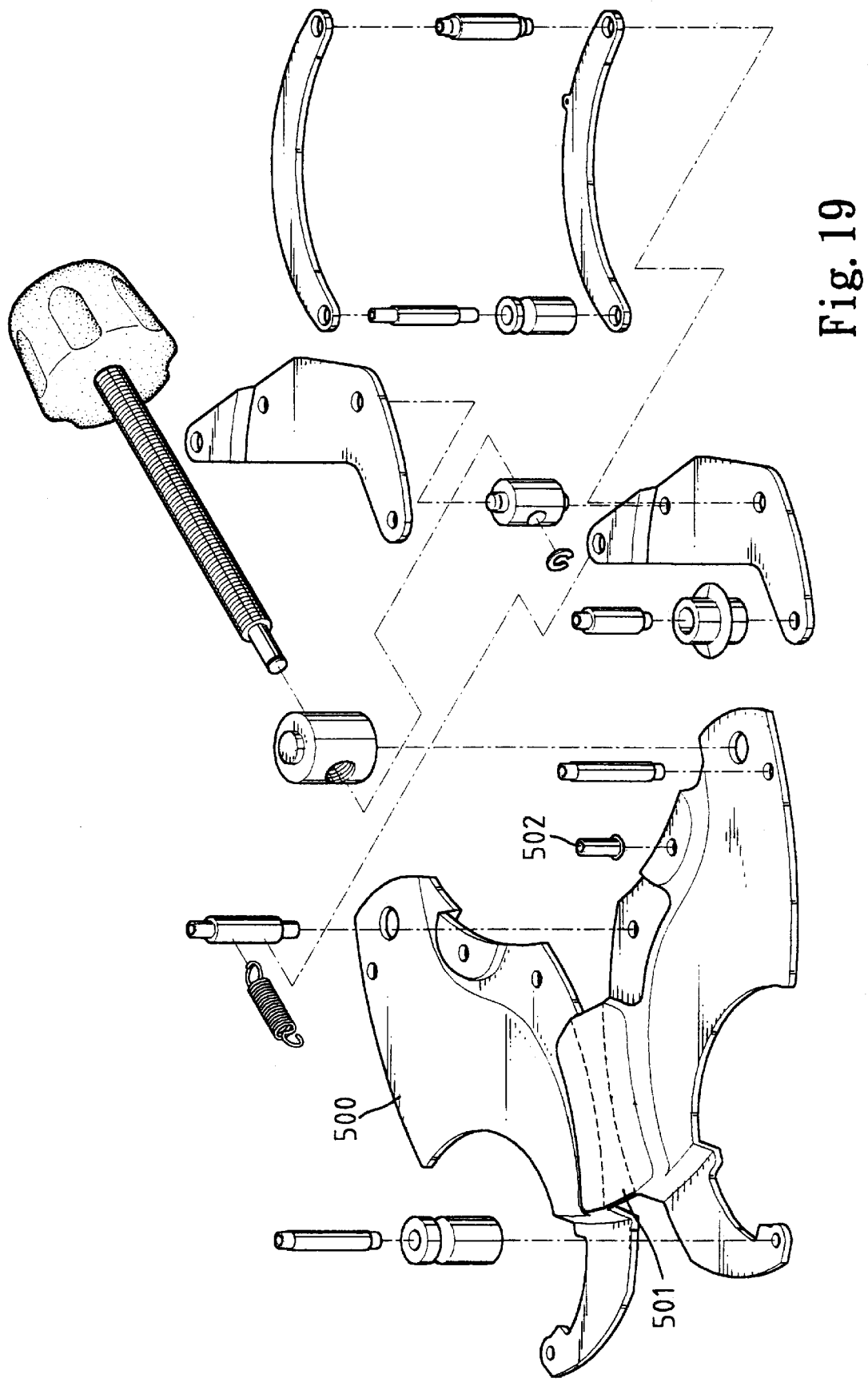
FIG. 19 is an exploded view of the fifth embodiment of the pipe cutter in accordance with the present invention.
Figure 20:
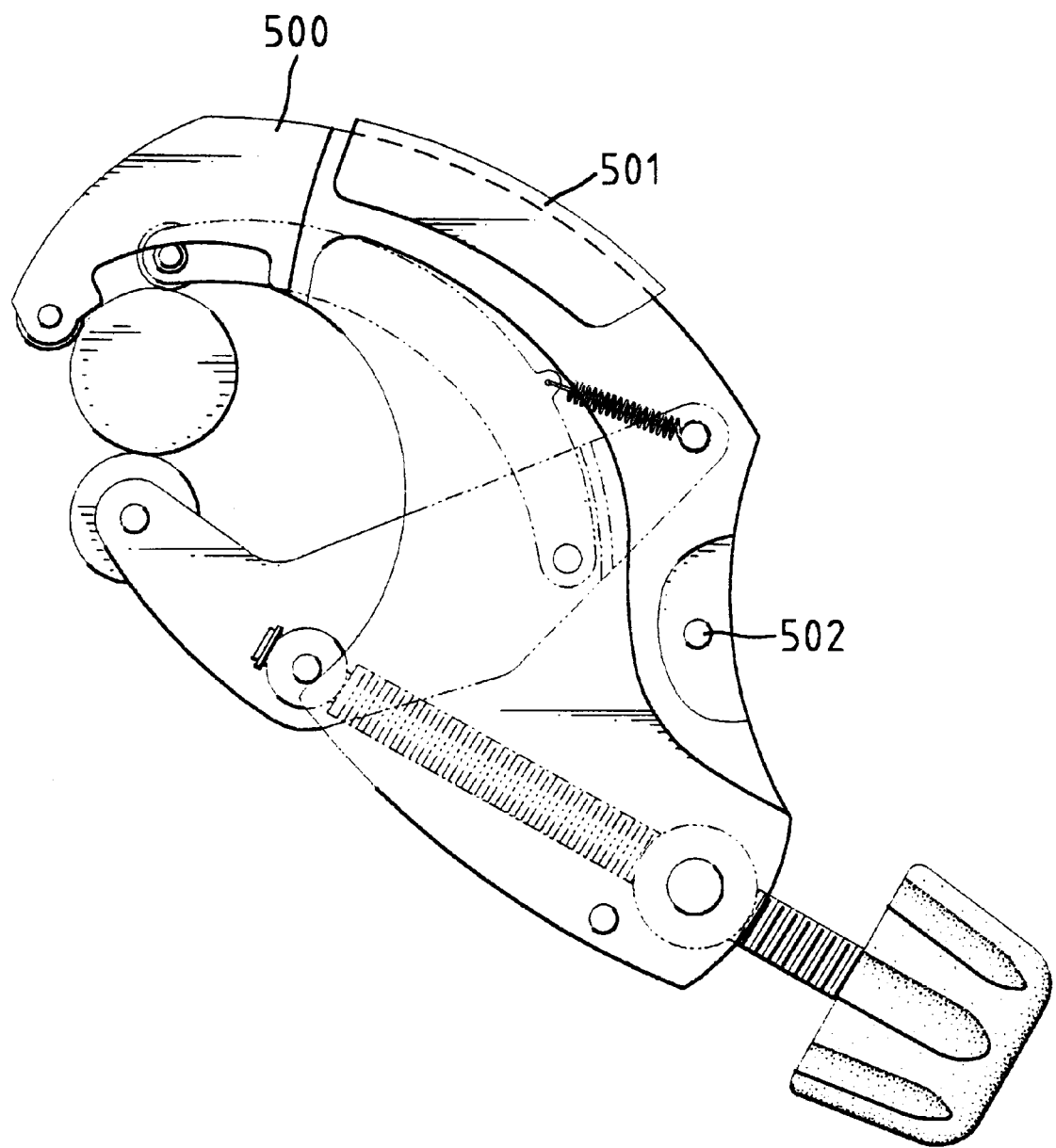
FIG. 20 is an illustrative view to illustrate the fifth embodiment of the pipe cutter of the in accordance with the present invention.

Referring to FIGS. 16 to 18 showing the fourth embodiment of the pipe cutter of the present invention, wherein the structure of the pipe cutter is the same as that shown in FIGS. 11 to 15 except that the fourth embodiment has no arcuate plate 301 as shown in FIG. 12. The two side walls 400 of the fourth embodiment of the pipe cutter are connected together by several rivets 401 so that all the parts such as the two links 402, 403 and the threaded rod 404 are received between the two side walls 400. FIGS. 19 and 20 show the fifth embodiment of the pipe cutter of the present invention, wherein the pipe cutter of the fifth embodiment is the same as that of the fourth embodiment except that a connecting plate 501 connects the two side walls 500 of the fifth embodiment and the connecting plate 501 is made of flexible and durable material so that the two side walls 500 can be folded toward to each other corresponding to the connecting plate 501, and the two side walls 500 are further connected by rivets 502.

The invention is not limited to the above embodiment but various modification thereof may be made. It will be understood by those skilled in the art that various changes in form and detail may made without departing from the scope and spirit of the present invention.

What is claimed is:

1. A pipe cutter comprising:
   a body having two side walls and each of said two side walls having an arcuate notch defined in one of two sides thereof, said body having a first end with a rod pivotally and movably extending therethrough and a second end having a first contacting member rotatably connected thereto;

a first link having a first end thereof pivotably connected to said body and a second end thereof having a disk blade rotatably connected thereto, said rod pivotally connected to said first link, and a second link having a first end thereof pivotally connected to said first link and a second end thereof having a second contacting member rotatably connected thereto, a spring biased between said second link and said body, said second contacting member having two protrusions extending centrally and longitudinally therefrom so as to move along said two arcuate notches.

2. The pipe cutter as claimed in claim 1 further comprising a knob connected to one of two ends thereof.

3. The pipe cutter as claimed in claim 1, wherein said rod is a threaded rod.

4. The pipe cutter as claimed in claim 1 further comprising a tube rotatably received in said first end of said body and said rod movably extending through said tube.

5. The pipe cutter as claimed in claim 1, wherein said body comprises an arcuate plate and said two side walls extend from two opposite sides of said arcuate plate.

6. The pipe cutter as claimed in claim 1, wherein each of said two side walls has an arcuate recess defined in the side in which the arcuate notch is defined so as to be adapted to receive a pipe to be cut.

7. The pipe cutter as claimed in claim 1, wherein each of said first link and said second link includes two plates connected with each other with a gap defined between said two plates.

8. The pipe cutter as claimed in claim 1 further comprising a connecting plate connected between said two side walls.

* * * * *